(12) United States Patent
Hayes et al.

(10) Patent No.: US 9,223,591 B2
(45) Date of Patent: Dec. 29, 2015

(54) SIZING A PANE OF A WINDOW PRESENTED ON A DISPLAY

(75) Inventors: Kyle Hayes, Reading (GB); Christopher Monahan, Bristol (GB); Thomas L. Roach, Winchester (GB); Domanic N. C. Smith-Jones, Sparkbrook (GB); Joseph R. Winchester, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 13/599,163

(22) Filed: Aug. 30, 2012

(65) Prior Publication Data

US 2014/0068505 A1  Mar. 6, 2014

(51) Int. Cl.
G06F 3/048 (2013.01)
G06F 9/44 (2006.01)
G06F 3/0481 (2013.01)
G06F 3/0484 (2013.01)

(52) U.S. Cl.
CPC ............ G06F 9/4443 (2013.01); G06F 3/0481 (2013.01); *G06F 3/0484* (2013.01)

(58) Field of Classification Search
USPC ........................................................ 715/789
See application file for complete search history.

(56) References Cited

U.S. PATENT DOCUMENTS

| 5,227,771 | A | * | 7/1993 | Kerr et al. ...................... 715/800 |
| 5,546,520 | A | * | 8/1996 | Cline et al. .................... 715/800 |
| 5,751,283 | A | * | 5/1998 | Smith ........................... 715/798 |
| 5,760,772 | A | * | 6/1998 | Austin .......................... 715/798 |
| 5,873,106 | A | * | 2/1999 | Joseph .......................... 715/203 |
| 6,232,971 | B1 | | 5/2001 | Haynes |
| 6,271,838 | B1 | * | 8/2001 | Gentner et al. ................ 715/788 |
| 6,335,743 | B1 | * | 1/2002 | Owings ......................... 715/801 |
| 6,414,698 | B1 | * | 7/2002 | Lovell et al. .................. 715/800 |
| 6,504,544 | B1 | * | 1/2003 | Hollingsworth et al. ...... 345/467 |
| 7,064,772 | B1 | * | 6/2006 | Thompson et al. ........... 345/661 |
| 7,216,293 | B2 | * | 5/2007 | Kataoka et al. ............... 715/246 |
| 7,216,302 | B2 | * | 5/2007 | Rodden et al. ................ 715/815 |
| 7,216,304 | B1 | * | 5/2007 | Gourdol et al. ............... 715/835 |
| 7,274,382 | B2 | * | 9/2007 | Plut ............................... 345/660 |

(Continued)

OTHER PUBLICATIONS

"Automatic Resizing of Icons in Lists When the Parent Window Is Resized," [online] IP.com, Ref. : IPCOM000102874D , Mar. 1, 1990, [retrieved Aug. 29, 2012] retrieved from the Internet: <http://ip.com/IPCOM/000102874#>, 1 pg.

*Primary Examiner* — Jennifer To
*Assistant Examiner* — Sunil Sundar
(74) *Attorney, Agent, or Firm* — Cuenot, Forsythe & Kim, LLC

(57) ABSTRACT

Sizing a pane of a window presented on a display. The window is presented to a user on the display. Within the window, the pane is presented at a first pane size. A user input is detected from the user resizing the window. Responsive to detecting the user input resizing the window, a new size of the window resulting from the user input resizing the window is detected. Data is accessed from a machine-readable storage device corresponding to at least one user-defined pane size previously defined by the user to whom the window is presented, wherein the user-defined pane size corresponds to a particular window size. Based on the accessed user-defined pane size(s), a second pane size of the pane at which the pane is to be presented in the newly sized window is determined. The pane is presented in the newly sized window at the second pane size.

15 Claims, 5 Drawing Sheets

(56) References Cited

U.S. PATENT DOCUMENTS

| | | | |
|---|---|---|---|
| 7,385,615 B2 * | 6/2008 | Vale et al. | 345/660 |
| 7,391,423 B1 * | 6/2008 | Manzari et al. | 345/619 |
| 7,590,947 B1 * | 9/2009 | Gay et al. | 715/800 |
| 7,730,418 B2 | 6/2010 | Wang et al. | |
| 8,223,165 B1 * | 7/2012 | Jitkoff et al. | 345/592 |
| 8,368,616 B1 * | 2/2013 | Harris | 345/1.1 |
| 8,458,614 B1 * | 6/2013 | Smith | 715/794 |
| 8,584,036 B2 * | 11/2013 | Hays et al. | 715/798 |
| 8,601,391 B2 * | 12/2013 | Jezek, Jr. | 715/800 |
| 2002/0191028 A1 * | 12/2002 | Senechalle et al. | 345/800 |
| 2003/0107604 A1 * | 6/2003 | Ording | 345/788 |
| 2005/0076019 A1 * | 4/2005 | Jackson et al. | 707/3 |
| 2006/0224992 A1 * | 10/2006 | Rossi et al. | 715/781 |
| 2006/0236264 A1 * | 10/2006 | Cain et al. | 715/788 |
| 2007/0033522 A1 * | 2/2007 | Lin et al. | 715/526 |
| 2008/0052637 A1 * | 2/2008 | Ben-Yoseph et al. | 715/800 |
| 2008/0092076 A1 * | 4/2008 | Bertram et al. | 715/777 |
| 2009/0264198 A1 * | 10/2009 | Takahashi et al. | 463/32 |
| 2010/0299628 A1 * | 11/2010 | Har'El et al. | 715/800 |
| 2011/0161868 A1 * | 6/2011 | Green et al. | 715/789 |
| 2011/0302528 A1 * | 12/2011 | Starr | 715/800 |
| 2013/0125047 A1 * | 5/2013 | Levin et al. | 715/790 |
| 2013/0125050 A1 * | 5/2013 | Goshey | 715/800 |

* cited by examiner

500

Detect a user input changing a size of a pane within a window from an original size to a new size
502

Responsive to detecting the user input changing the size of the pane from the original size to the new size, store to the machine-readable storage device data corresponding to a respective size of the window when the pane is resized and the new size of the pane.
504

Present a window on a display to a user and present, within the window, a pane at a first pane size
602

Detect a user input from the user resizing the window
604

Detect a new size of the window resulting from the user input resizing the window
606

Access, from a machine-readable storage device, data corresponding to at least one user-defined pane size previously defined by the user to whom the window is presented, wherein the user-defined pane size corresponds to a particular window size
608

Determine, via a processor, based on the accessed at least one user-defined pane size, a second pane size of the pane at which the pane is to be presented in the newly sized window
610

Present the pain in the newly sized window at the second pane size
612

FIG. 6

SIZING A PANE OF A WINDOW PRESENTED ON A DISPLAY

BACKGROUND

Arrangements described herein relate to a graphical user interface and, more particularly, to presentation of panes within a window.

A graphical user interface (GUI) is a type of user interface that allows users to interact with electronic devices using images rather than text commands. GUIs can be used in computers, hand-held devices (e.g., smart phones), portable media players, gaming devices, office equipment, small appliances, etc. A GUI represents the information and actions available to a user through graphical icons and visual indicators such as secondary notation, as opposed to text-based interfaces, typed command labels or text navigation. The actions are usually performed through direct manipulation of the graphical elements.

Typically, a GUI uses windows to facilitate user interaction with the GUI. Windows are two dimensional objects arranged on a presentation plane, commonly referred to as a "desktop." Windows oftentimes include other graphical objects, such as a menu-bar, toolbars, controls, icons and often a work area. In a main work area of the window, a document, image, folder contents or other main object is displayed. Around the main work area, for example within boundary areas of the window, there may be other window areas, sometimes smaller than the main work area, referred to as "panes" or "panels," showing relevant information or options related to information presented in the main work area. Generally speaking, the main work area of a single document interface holds a main object. Child windows in multiple document interfaces, and tabs in web browsers, can make several similar documents or main objects available within a single main application window.

BRIEF SUMMARY

One or more embodiments disclosed within this specification relate to sizing a pane of a window presented on a display. An embodiment can include presenting the window on the display to a user and presenting, within the window, the pane at a first pane size. A user input is detected from the user resizing the window. Responsive to detecting the user input resizing the window, a new size of the window resulting from the user input resizing the window is detected. Data is accessed from a machine-readable storage device corresponding to at least one user-defined pane size previously defined by the user to whom the window is presented, wherein the user-defined pane size corresponds to a particular window size. Based on the accessed user-defined pane size(s), a second pane size of the pane at which the pane is to be presented in the newly sized window is determined. The pane is presented in the newly sized window at the second pane size.

Another embodiment can include a system including a processor configured to initiate executable operations. Such operations can include presenting a window on a display to a user and presenting, within the window, a pane at a first pane size. The operations further can include detecting a user input from the user resizing the window and, responsive to detecting the user input resizing the window, detecting a new size of the window resulting from the user input resizing the window, and accessing, from a machine-readable storage device, data corresponding to at least one user-defined pane size previously defined by the user to whom the window is presented, wherein the user-defined pane size corresponds to a particular window size, The operations further can include determining, via a processor, based on the accessed at least one user-defined pane size, a second pane size of the pane at which the pane is to be presented in the newly sized window, and presenting the pane in the newly sized window at the second pane size.

Another embodiment can include a computer program product for sizing a pane of a window presented on a display. The computer program product can include a computer-readable storage medium having stored thereon program code that, when executed, configures a processor to perform executable operations. Such operations may include presenting a window on a display to a user and presenting, within the window, a pane at a first pane size. A user input is detected from the user resizing the window. Responsive to detecting the user input resizing the window, a new size of the window resulting from the user input resizing the window is detected. Data is accessed from a machine-readable storage device corresponding to at least one user-defined pane size previously defined by the user to whom the window is presented, wherein the user-defined pane size corresponds to a particular window size. Based on the accessed user-defined pane size(s), a second pane size of the pane at which the pane is to be presented in the newly sized window is determined. The pane is presented in the newly sized window at the second pane size.

BRIEF DESCRIPTION OF THE SEVERAL VIEWS OF THE DRAWINGS

FIG. 5 is a flow chart illustrating a method of acquiring data for use in sizing a pane of a window presented on a display in accordance with an embodiment disclosed within this specification.

FIG. 6 is a flow chart illustrating a method of sizing a pane of a window presented on a display in accordance with an embodiment disclosed within this specification.

DETAILED DESCRIPTION

Figure 1:
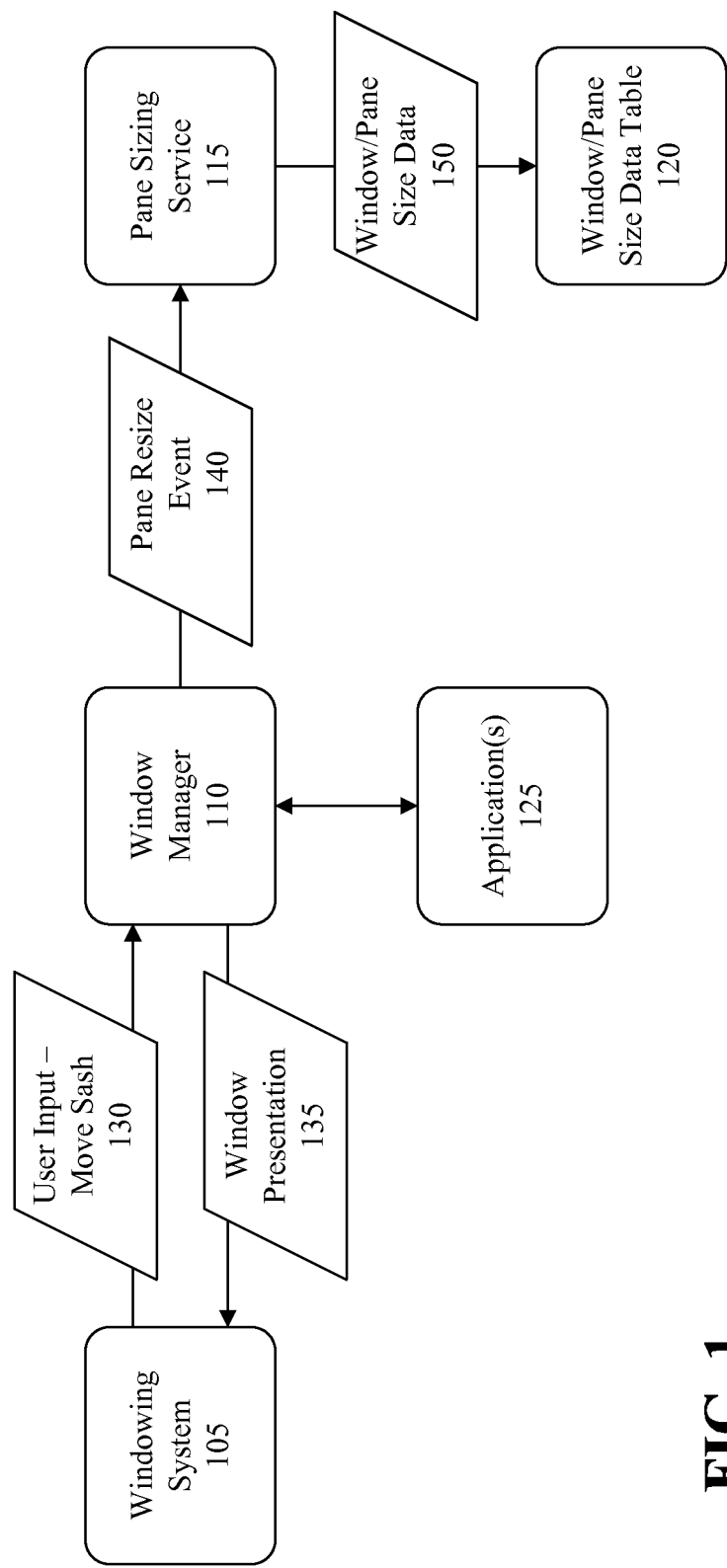
FIG. 1 depicts a block diagram of a system for sizing a pane of a window presented on a display in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowcharts and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowcharts and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

For purposes of explanation, specific nomenclature is set forth to provide a thorough understanding of the various inventive concepts disclosed herein. However, the terminology used herein is for the purpose of describing particular embodiments only and is not intended to be limiting of the invention. As used herein, the term "sash" means a moveable vertical or horizontal bar used to adjust a size of a pane or panel within a window presented on a display via a graphical user interface. As used herein, the term "window manager" means system software that controls the placement and appearance of windows within a windowing system in a graphical user interface. As used herein, the term "windowing system" means system software that supports the implementation of window managers, and provides basic support for graphics hardware, pointing devices (e.g., mice), and keyboards. As used herein, the term "user" means a human being interfacing with a processing system. As used herein, the term "area" means a quantity that expresses the extent of a two-dimensional surface or shape in a plane. As used herein, the term "real time" means a level of processing responsiveness that a user or system senses as sufficiently immediate for a particular process or determination to be made, or that enables the processor to keep up with some external process (e.g., a user input resizing a window).

In accordance with the arrangements described herein, a graphical user interface (GUI) presents one or more windows on a display to facilitate user interactions with one or more applications. In illustration, a window for a particular application may be presented on, or over, a desktop, as is known to those skilled in the art. The application may provide a main work area. Around or within the main work area, for example within boundary areas of the window, the application may provide other window areas, referred to as "panes" or "panels," showing relevant information or options related to information presented in the main work area. Hereinafter, and in the claims that follow, "panes" and "panels" collectively will be referred to as "panes." Thus, reference to a pane hereinafter, and the claims that follow, means reference to a pane and/or reference to a panel.

Within a window, at least one boundary of a pane is defined by a respective sash. The sash is configured to be user moveable, enabling the user to move the sash to selectively adjust the size of the pane (e.g., height, width and/or area). When the user moves the sash from an original position to a new position, the user-defined size of the pane resulting from the sash being moved, and the size of the window when the sash is moved, is recorded. Such data recordation can occur each time the user moves the sash soon after opening or resizing the window, or within a particular number of user related events after the window is opened or resized by the user. Thus, an understanding of the user's panel size preferences with respect to window size will be understood. Each time the user enters an input to resize a particular window in which the pane is presented, the GUI will resize the pane according to the window size based on the understanding of the user's preferences gleaned from the recorded data.

FIG. 1 depicts a block diagram of a system 100 for sizing a pane of a window presented on a display in accordance with an embodiment disclosed within this specification. The system 100 can include a windowing system 105, a window manager 110, a pane sizing service 115, a window/pane size data table 120, and one or more applications 125. The window manager 110 can be configured to control the placement and appearance of windows within the GUI and facilitate the interactions between windows, applications, and the windowing system 105. The windowing system 105 is configured to handle hardware devices such as one or more pointing devices (e.g., a mouse, a touch pad, a trackball, or the like), a keyboard and graphics hardware, as well as the positioning of a pointer controlled by a pointing device. The windowing system 105 and the window manager 110 can be components of a GUI. The GUI can be a component of an operating system or as software that interacts with the operating system.

In one arrangement, the pane sizing service 115 can be a component of the GUI. The pane sizing service 115 can be exposed to applications 125 via an application programming interface (API), though this need not be the case. In another arrangement, the pane sizing service 115 can be implemented as software distinct from the GUI, though communicative linked to the GUI via the operating system. In illustration, the pane sizing service 115 can be executed by the operating system as a stand-alone alone application, or as a component of an application 125 with which the user interfaces in the window in which the user resizable pane is presented. For web-based applications 125, the pane sizing service 115 can be exposed using a JavaScript® library, for example a Dojo library.

The window/pane size data table 120 can be a data table exposed to the pane sizing service 115 in any suitable manner. For example, the window/pane size data table 120 can be a data table defined within the GUI, a data table within the operating system, a data table within a database, or a data table hosted elsewhere.

Figure 2:
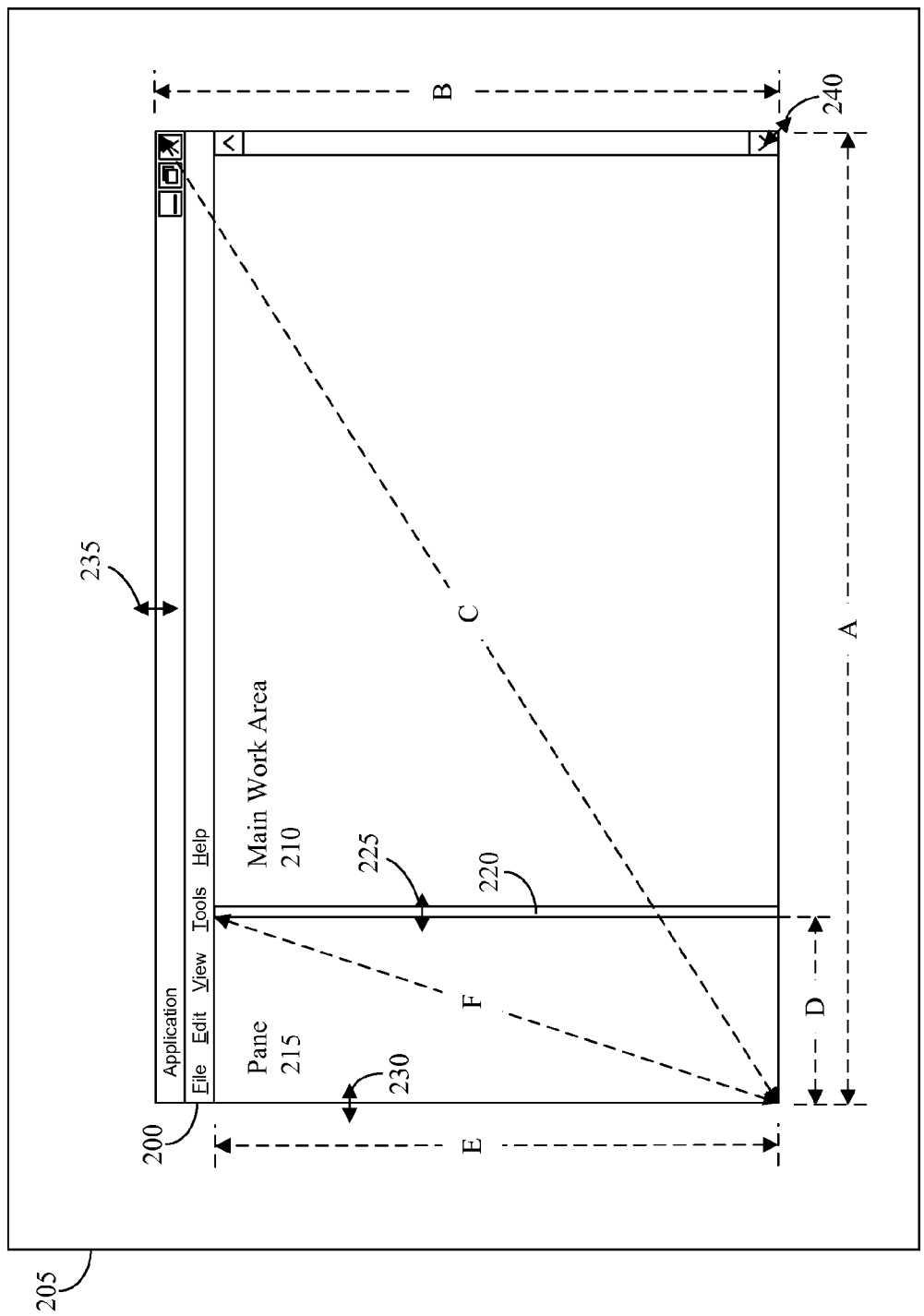
FIG. 2 depicts a view of a window presented on a display in accordance with an embodiment disclosed within this specification.

FIG. 2 depicts a view of a window 200 presented on a display in accordance with an embodiment disclosed within this specification. In illustration, the window 200 can be presented on a desktop 205 presented on the display by the GUI. The window 200 can present to a user via which the user can interact with a particular application 125 (FIG. 1). The window 200 can present a main work area 210 and a pane 215. The pane 215 can be bounded, at least on one side, by a sash 220. For example, the sash 220 can represent a boundary between the pane 215 and the main work area 210. The sash 220 can be presented vertically within the window 200, for example if the pane 215 is presented to the left or right of the main work area 210, or presented horizontally within the window 200, for example if the pane 215 is presented above or below the main work area 210.

The sash 220 can be configured to be user moveable. For example, the user can select the sash 220, for example by placing a cursor over the sash 220 and depressing a left mouse button, and drag the sash 220 to a desired position, for example by moving the mouse left, right, up and/or down. As the sash 220 is moved, the size of the pane 215 will change. Thus, the user can move the sash from one position to another to resize the pane 215. In lieu of using a mouse to move the sash 220, the user may use a touchpad, a trackball, or any other suitable pointing device. In another arrangement, the user can enter particular keystrokes via a keyboard to move the sash 220.

Referring both to FIG. 1 and FIG. 2, in operation, the windowing system 105 can detect the user input to move the sash 220 within the window 200, and can communicate data 130 to the window manager 110 corresponding to the user input. For example, the data 130 can indicate the type of user input and a position of a pointer as the pointer is moved. Such position can be indicated by a sash movement indicator 225. Based on this data 130, the window manager 110, knowing the position of the window 200 on the user's desktop 205 and the position of the sash 220 within the window 200 before the user input, can process the data 130 to move the sash 220 from its original position to a new position, thereby resizing the pane 215. As the data 130 is received, the window manager 110 can update window presentation data 135 communicated to the windowing system 105 to present the window 200 and the pane 215 on the display as the pane 215 is being resized.

When the user input is complete (e.g., when the user releases the left mouse button), the window manager can generate a pane resize event 140, which can be detected by the pane sizing service 115. In response to the pane resize event 140, the pane sizing service 115 can determine the size of the window 200, the size of the pane 215, and the application 125 with which the window 200 presently is associated. The pane sizing service 115 store such window/pane size data 150 (including an identifier that identifies the application 125) to the window/pane size data table 120. To determine the size of the window, the size of the pane 215 and the application 125, the pane sizing service 115 can retrieve such data 150 from the window manager 110, for example by querying the window manager 110. In another arrangement, the window manager 110 can communicate the window/pane size data 150 to the pane sizing service 115 when the pane resize event 140 is generated.

The window/pane size data 150 can represent the respective sizes of the window 200 and the pane 215 in any suitable manner. For example, the size of the window 200 can be represented using one or more linear dimensions, such as a width dimension A, a height dimension B and/or a diagonal dimension C, or represented using an area value corresponding to the area of the window 200. The linear dimension(s) and/or area value can be specified as numbers of pixels, as percentages with respect to the desktop linear dimension(s) and/or area of the desktop 205, or as any other suitable values.

The size of the pane 215 also can be represented using one or more linear dimensions, such as a width dimension D, a height dimension E and/or a diagonal dimension F, or represented using an area value corresponding to the area of the pane 215. In one arrangement, the linear dimension(s) and/or area value of the size of the pane 215 can be specified as numbers of pixels. In another arrangement, the linear dimension(s) and/or area value of the size of the pane 215 can be specified as percentages with respect to the window 200 linear dimension(s) and/or area of the window 200, or with respect to the desktop linear dimension(s) and/or area of the desktop 205. Still, the linear dimension(s) and/or area value can be specified using any other suitable values, and the present arrangements are not limited in this regard. In an arrangement in which the sash 220 is oriented vertically, the width dimension D can identify a location of the sash 220 in the window 200. In an arrangement in which the sash 220 is oriented horizontally, the corresponding height dimension can identify a location of the sash 220 in the window 200. Further, in an arrangement in which the pane 215 is bounded by a plurality of sashes 220, for example on two or more sides, the size of the pane 215 can be represented by respective dimensions that indicate the locations of the sashes 220, though this need not be the case.

Regardless of how the window/pane size data 150 represents the respective sizes of the window 200 and the pane 215, the window/pane size data 150 represent a correlation between the size of the pane 215, as selected by the user, and the size of the window 200 for the particular application 125. Moreover, additional window/pane size data 150 can be stored to the window/pane size data table 120 each time the user resizes the pane 215 after the window 200 has been resized or opened. In this regard, the pane sizing service 115 can be configured to detect pane resize events 140 for a particular period of time after the window is resized or opened, within a particular number of user interactions with the window 200 after the window is resized or opened, or prior to a particular type of user interaction with the window 200 being detected. For instance, the pane sizing service 115 can be configured to detect pane resize events 140 prior to the user inputting data, or a certain amount of data, into the main work area 210. Thus, additional window/pane size data 150 can be accumulated over time, and can be used by the pane sizing service 115 to automatically resize the pane 215 when the window 200 is opened or resized.

Figure 3:
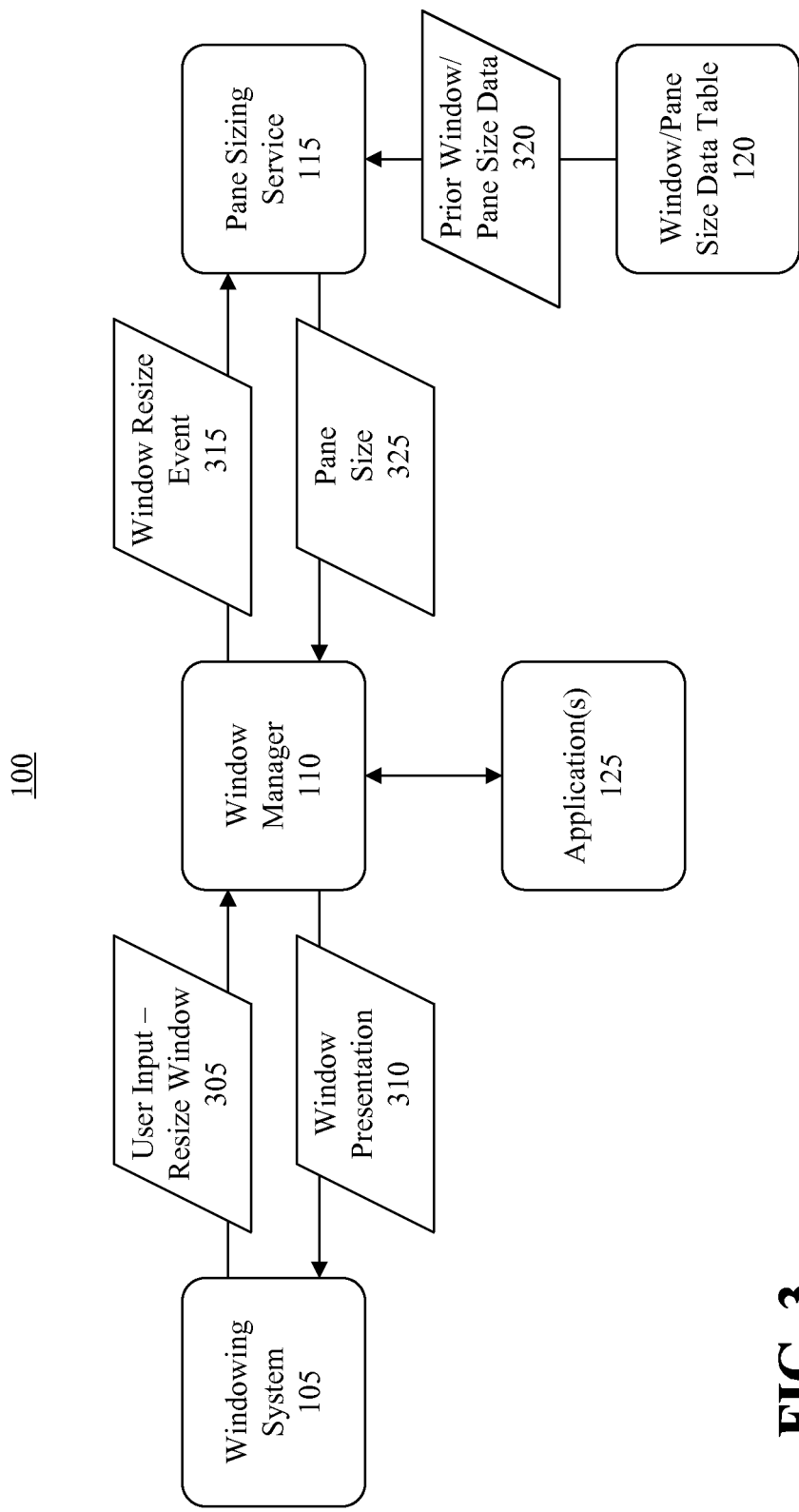
FIG. 3 depicts a block diagram of the system of FIG. 1 in accordance with a further embodiment disclosed within this specification.

FIG. 3 depicts a block diagram of the system 100 of FIG. 1 in accordance with a further embodiment disclosed within this specification. The system 100 can include the windowing system 105, the window manager 110, the pane sizing service 115, the window/pane size data table 120 and the application(s) 125.

Referring both to FIG. 2 and FIG. 3. The window 200 can be presented having a particular size, and the pane 215 can be presented in the window, also having a particular size. A user may choose to resize the window 200, for example to change the width of the window, change the height of the window 200 or change the diagonal size of the window. Such resizing is represented by respective window resize indicators 230, 235, 240.

The windowing system 105 can detect the user input resizing the window 200, and can communicate data 305 to the window manager 110 corresponding to the user input. For example, the data 305 can indicate the type of user input and a position of a pointer as the pointer is moved. Such position can be indicated by a respective indicator 230, 235, 240. Based on this data 305, the window manager 110, knowing the position of the window 200 on the user's desktop 205 before the user input, can process the data 130 to resize the window 200 from an original size to a new size. As the data 305 is received, the window manager 110 can update window presentation data 310 communicated to the windowing system 105 to present the window 200 on the display as the window 200 is being resized.

When the user input is complete (e.g., when the user releases the left mouse button), the window manager 110 can generate a window resize event 315, which can be detected by the pane sizing service 115. In response to the window resize event 315, the pane sizing service 115 can determine the new size of the window 200, for example by retrieving such data from the window manager 110. As noted, the pane sizing service 115 can query the window manager 110 for the new window size data or the window manager 110 can communicate the new window size data to the pane sizing service 115 when the window resize event 315 is generated.

Further, the pane sizing service 115 can access from the window/pane size data table 120 previously stored data 320 pertaining to one or more user-defined pane sizes previously defined by the user to whom the window is presented. Each user-defined pane size can correspond to a respective particular window size and a particular application 125. Based on this data, and the new size of the window, the pane sizing service 115 can determine a pane size for the pane 215 that is appropriate for the new size of the window 200. The pane sizing service 115 can communicate the pane size 325 to the window manager 110. In response, the window manager 110 can update window presentation data 310 communicated to the windowing system 105 to present the pane 215 at the indicated pane size 325.

In one arrangement, rather than waiting for the user to complete the window resize before the window manager 110 generates a window resize event 315, the window manager can generate a series of window resize events 315 as the window 200 is being resized. The pane sizing service 115 can access the window resize events 315 in real time, and generate a corresponding series of pane sizes 325, which the window manager 110 can process to update the window presentation data 310 in real time. Accordingly, as the user resizes the window 200, the pane 215 can be automatically resized in real time, which will appear to the user as a smooth resizing of the pane 215 as the user resizes the window 200.

In one arrangement, to determine a pane size for the pane 215 that is appropriate for the new size of the window 200, the pane sizing service 115 can access prior window/pane size data 320 corresponding to a plurality of user-defined pane sizes for the particular application 125, each of the plurality of user-defined pane sizes corresponding to a respective window size. Further, the pane sizing service 115 can interpolate the new pane size for the pane 215 from the plurality of user-defined pane sizes. For example, the pane sizing service 115 can identify in the data 320 at least one of the respective window sizes that is smaller than the newly sized window 200, and select at least a first of the respective user-defined pane sizes corresponding to that smaller window. The pane sizing service 115 also can identify in the data 320 at least one of the respective window sizes that is larger than the newly sized window 200, and select at least a second of the respective user-defined pane sizes corresponding to that larger window. The pane sizing service 115 can interpolate the new pane size from the data corresponding to at least the first and second of the respective user-defined pane sizes.

In another arrangement, to determine a pane size for the pane 215 that is appropriate for the new size of the window 200, the pane sizing service 115 can access prior window/pane size data 320 corresponding to a plurality of user-defined pane sizes associated with the application 125, each of the plurality of user-defined pane sizes corresponding to a respective window size. Based on the plurality of user-defined pane sizes and the respective window sizes, the pane sizing service 115 can generate an equation that correlates pane size to window size, and apply the equation to determine the new pane size for the pane 215. The equation can be generated, for example, using least squares approach to fit the equation to the data 320, or any other suitable approach to automatically generating an equation. In this regard, although the equation may be linear, this is not always the case. For example, the equation may be a quadratic equation, a cubic equation, a quartic equation, or any other type of equation.

By way of example, there may be a minimum size of the pane 215 the user chooses regardless of how small the window 200 is, or a maximum size of the pane 215 the user chooses regardless of how large the window 200 is. Moreover, the user's selection of pane sizes need not directly correlate to the size of the window 200. For example, when the window 200 is 25% of the size of the desktop 205, the user may select the pane 215 to be 40% of the size of the window 200. When the window 200 is 50% of the size of the desktop 205, the user may select the pane 215 to be 25% of the size of the window 200. When the window 200 is 75% of the size of the desktop 205, the user may select the pane 215 to be 20% of the size of the window 200. The equation that correlates pane size to window size can be generated to according to such user preferences.

In some instances, the user's previous selections of pane sizes may be somewhat erratic. For example, at one point when the window size was 420 pixels, the user may have chosen a pane size of 25% of the window size, while at another point when the window size was 421 pixels, the user may have chosen a pane size of 99% of the window size, and so on. In this example, the window sizes are approximately the same, but the pane size data is radically different. To prevent radically different pane sizes from being presented in the window at various times when the window is approximately the same size, statistical smoothing can be performed on the pane size data. For example, pane size data for an approximate window size can be averaged, or pane size data radically different than other pane size data for an approximate window size can be ignored. For instance, pane size data outside of a standard deviation value can be ignored.

Figure 4:
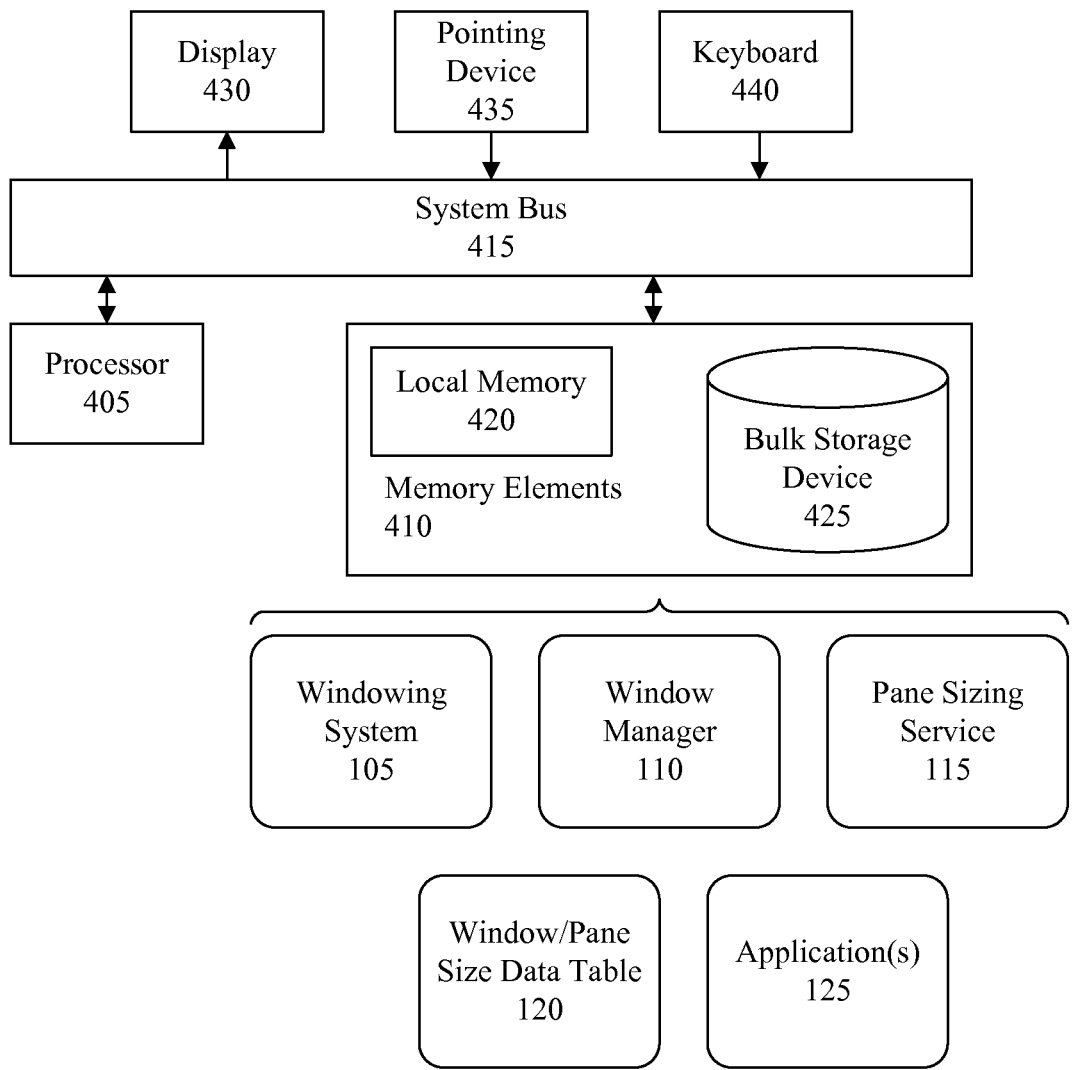
FIG. 4 depicts a block diagram of a processing system configured to size a pane of a window presented on a display in accordance with an embodiment disclosed within this specification.

FIG. 4 depicts a block diagram of a processing system 400 configured to size a pane of a window presented on a display in accordance with an embodiment disclosed within this specification. The processing system 400 can include at least one processor 405 coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a computer, a workstation, a mobile computer, a laptop computer, tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the processing system 400. The I/O devices can be coupled to the processing system 400 either directly or through intervening I/O controllers. For example, the display 430 can be coupled to the processing system 400 via a graphics processing unit (GPU), which may be a component of the processor 405 or a discrete device.

As pictured in FIG. 4, the memory elements 410 can store the components of the system 100 of FIGS. 1 and 3, namely the windowing system 105, the window manager 110, the pane sizing service 115, the window/pane size data table 120, and the application(s) 125. Being implemented in the form of executable program code, these components of the system 100 can be executed by the processing system 400 and, as such, can be considered part of the processing system 400.

FIG. 5 is a flow chart illustrating a method 500 of acquiring data for use in sizing a pane of a window presented on a display in accordance with an embodiment disclosed within this specification. At step 502, a user input changing a size of pane within a window from an original size to a new size can be detected. The original size is the size of the pane upon the window being opened or resized. At step 504, responsive to detecting the user input changing the size of the pane from the original size to the new size, data corresponding to at least a respective size of the window when the pane is resized and the new size of the pane can be stored to a machine-readable storage device. The method 500 can be implemented each time the size of the pane is adjusted by the user immediately, or soon, after the window is opened or resized and/or when a limited number of interactions by the user with the main work area have been detected since the window was opened or resized.

FIG. 6 is a flow chart illustrating a method 600 of sizing a pane of a window presented on a display in accordance with an embodiment disclosed within this specification. At step 602, a window can be presented on a display to a user. Within the window, a pane can be presented at a first pane size.

At step 604, a user input from the user resizing the window of the window can be detected. Responsive to detecting the user input resizing the window, at step 606 a new size of the window resulting from the user input resizing the window can be detected. At step 608, data corresponding to at least one user-defined pane size previously defined by the user to whom the window is presented can be accessed from a machine-readable storage device. The user-defined pane size corresponds to a particular window size. At step 610, based on the accessed at least one user-defined pane size, a second pane size of the pane at which the pane is to be presented in the newly sized window can be determined, for example via a processor executing suitable program code. At step 612, the pane can be presented in the newly sized window at the second pane size.

Like numbers have been used to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of sizing a pane of a window presented on a display, the method comprising:
   presenting the window on the display to a user;
   presenting, within the window, the pane at a first pane size;
   detecting a user input from the user resizing the window;
   responsive to detecting the user input resizing the window:
   detecting a new size of the window resulting from the user input resizing the window;
   accessing, from a machine-readable storage device, data corresponding to at least one user-defined pane size previously defined by the user to whom the window is presented, wherein the user-defined pane size corresponds to a particular window size;
   determining, via a processor, based on the accessed at least one user-defined pane size, a second pane size of the pane at which the pane is to be presented in the newly sized window; and
   presenting the pane in the newly sized window at the second pane size, wherein
   accessing the data corresponding to at least one user-defined pane size previously defined by the user to whom the window is presented comprises:
      accessing data corresponding to a plurality of user-defined pane sizes, each of the plurality of user-defined pane sizes corresponding to a respective window size,
   determining the second pane size of the pane at which the pane is to be presented in the newly sized window comprises:
      interpolating the second pane size from the data corresponding to the plurality of user-defined pane sizes, and
   interpolating the second pane size from the data corresponding to the plurality of user-defined pane sizes comprises:
      identifying in the data at least one of the respective window sizes that is smaller than the newly sized window, and selecting at least a first of the respective user-defined pane sizes corresponding to that smaller window;
      identifying in the data at least one of the respective window sizes that is larger than the newly sized window, and selecting at least a second of the respective user-defined pane sizes corresponding to that larger window; and
      interpolating the second pane size from data corresponding to at least the first and second of the respective user-defined pane sizes.

2. The method of claim 1, wherein determining the second pane size of the pane at which the pane is to be presented in the newly sized window comprises:
   based on the plurality of user-defined pane sizes and the respective window sizes, generating an equation that correlates pane size to window size; and
   applying the equation that correlates pane size to window size to determine the second pane size.

3. The method of claim 1, wherein:
   the user-defined pane size previously defined by the user to whom the window is presented, the particular window size to which the user-defined pane size corresponds, and the determined second pane size each are respective linear dimensions.

4. The method of claim 1, wherein:
   the user-defined pane size previously defined by the user to whom the window is presented, the particular window size to which the user-defined pane size corresponds, and the determined second pane size each are respective area values.

5. The method of claim 1, further comprising:
   detecting a user input changing a size of the pane within the window from an original size to a new size;

responsive to detecting the user input changing the size of the pane from the original size to the new size, storing to the machine-readable storage device data corresponding to at least a respective size of the window when the pane is resized and the new size of the pane.

6. A system comprising:
a processor configured to initiate executable operations comprising:
presenting the window on the display to a user;
presenting, within the window, the pane at a first pane size;
detecting a user input from the user resizing the window;
responsive to detecting the user input resizing the window:
detecting a new size of the window resulting from the user input resizing the window;
accessing, from a machine-readable storage device, data corresponding to at least one user-defined pane size previously defined by the user to whom the window is presented, wherein the user-defined pane size corresponds to a particular window size;
determining, via a processor, based on the accessed at least one user-defined pane size, a second pane size of the pane at which the pane is to be presented in the newly sized window; and
presenting the pane in the newly sized window at the second pane size, wherein
accessing the data corresponding to at least one user-defined pane size previously defined by the user to whom the window is presented comprises:
accessing data corresponding to a plurality of user-defined pane sizes, each of the plurality of user-defined pane sizes corresponding to a respective window size,
determining the second pane size of the pane at which the pane is to be presented in the newly sized window comprises:
interpolating the second pane size from the data corresponding to the plurality of user-defined pane sizes, and
interpolating the second pane size from the data corresponding to the plurality of user-defined pane sizes comprises:
identifying in the data at least one of the respective window sizes that is smaller than the newly sized window, and selecting at least a first of the respective user-defined pane sizes corresponding to that smaller window;
identifying in the data at least one of the respective window sizes that is larger than the newly sized window, and selecting at least a second of the respective user-defined pane sizes corresponding to that larger window; and
interpolating the second pane size from data corresponding to at least the first and second of the respective user-defined pane sizes.

7. The system of claim 6, wherein determining the second pane size of the pane at which the pane is to be presented in the newly sized window comprises:
based on the plurality of user-defined pane sizes and the respective window sizes, generating an equation that correlates pane size to window size; and
applying the equation that correlates pane size to window size to determine the second pane size.

8. The system of claim 6, wherein:
the user-defined pane size previously defined by the user to whom the window is presented, the particular window size to which the user-defined pane size corresponds, and the determined second pane size each are respective linear dimensions.

9. The system of claim 6, wherein:
the user-defined pane size previously defined by the user to whom the window is presented, the particular window size to which the user-defined pane size corresponds, and the determined second pane size each are respective area values.

10. The system of claim 6, further comprising:
detecting a user input changing a size of the pane within the window from an original size to a new size;
responsive to detecting the user input changing the size of the pane from the original size to the new size, storing to the machine-readable storage device data corresponding to at least a respective size of the window when the pane is resized and the new size of the pane.

11. A computer program product for sizing a pane of a window presented on a display, the computer program product comprising:
a computer-readable storage medium having stored thereon program code that, when executed, configures a processor to perform executable operations comprising:
presenting the window on the display to a user;
presenting, within the window, the pane at a first pane size;
detecting a user input from the user resizing the window;
responsive to detecting the user input resizing the window:
detecting a new size of the window resulting from the user input resizing the window;
accessing, from a machine-readable storage device, data corresponding to at least one user-defined pane size previously defined by the user to whom the window is presented, wherein the user-defined pane size corresponds to a particular window size;
determining, via a processor, based on the accessed at least one user-defined pane size, a second pane size of the pane at which the pane is to be presented in the newly sized window; and
presenting the pane in the newly sized window at the second pane size, wherein
accessing the data corresponding to at least one user-defined pane size previously defined by the user to whom the window is presented comprises:
accessing data corresponding to a plurality of user-defined pane sizes, each of the plurality of user-defined pane sizes corresponding to a respective window size,
determining the second pane size of the pane at which the pane is to be presented in the newly sized window comprises:
interpolating the second pane size from the data corresponding to the plurality of user-defined pane sizes, and
interpolating the second pane size from the data corresponding to the plurality of user-defined pane sizes comprises:
identifying in the data at least one of the respective window sizes that is smaller than the newly sized window, and selecting at least a first of the respective user-defined pane sizes corresponding to that smaller window;
identifying in the data at least one of the respective window sizes that is larger than the newly sized window, and selecting at least a second of the respective user-defined pane sizes corresponding to that larger window; and
interpolating the second pane size from data corresponding to at least the first and second of the respective user-defined pane sizes, wherein the computer-readable storage medium is not a transitory, propagating signal per se.

12. The computer program product of claim 11, wherein determining the second pane size of the pane at which the pane is to be presented in the newly sized window comprises:
- based on the plurality of user-defined pane sizes and the respective window sizes, generating an equation that correlates pane size to window size; and
- applying the equation that correlates pane size to window size to determine the second pane size.

13. The computer program product of claim 11, wherein:
- the user-defined pane size previously defined by the user to whom the window is presented, the particular window size to which the user-defined pane size corresponds, and the determined second pane size each are respective linear dimensions.

14. The computer program product of claim 11, wherein:
- the user-defined pane size previously defined by the user to whom the window is presented, the particular window size to which the user-defined pane size corresponds, and the determined second pane size each are respective area values.

15. The computer program product of claim 11, wherein the executable operations further comprise:
- detecting a user input changing a size of the pane within the window from an original size to a new size;
- responsive to detecting the user input changing the size of the pane from the original size to the new size, storing to the machine-readable storage device data corresponding to at least a respective size of the window when the pane is resized and the new size of the pane.

* * * * *